March 31, 1925.                                                    1,532,102
G. C. FILE
TRANSMISSION MECHANISM
Filed March 10, 1924                    2 Sheets-Sheet 2
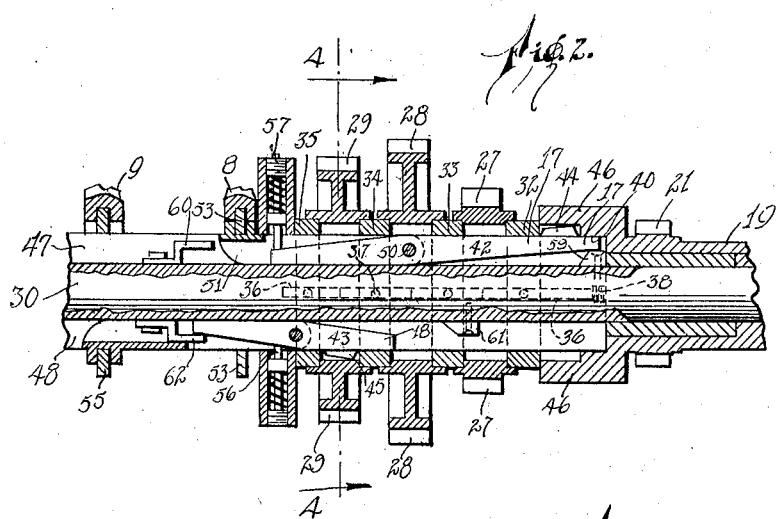
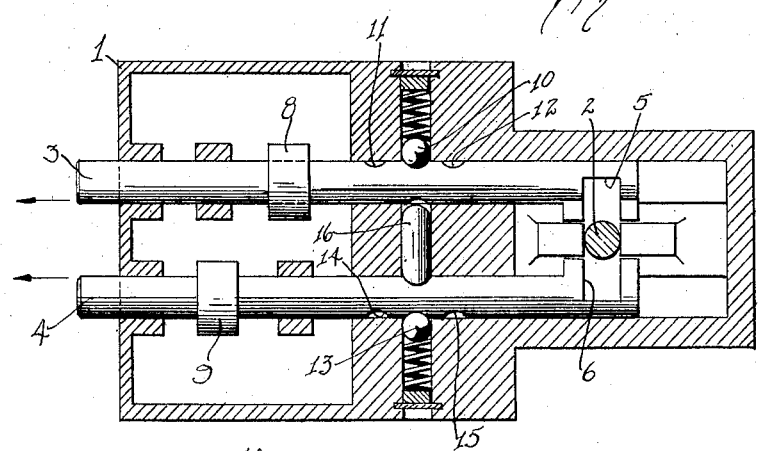
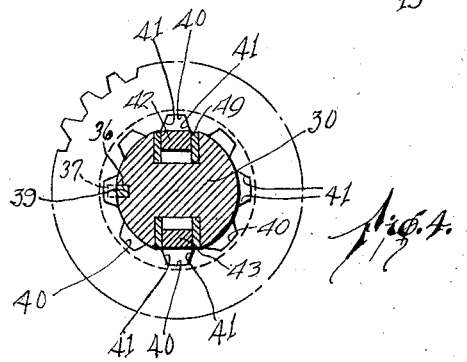
INVENTOR
G. C. File
BY
ATTORNEYS Patented Mar. 31, 1925.

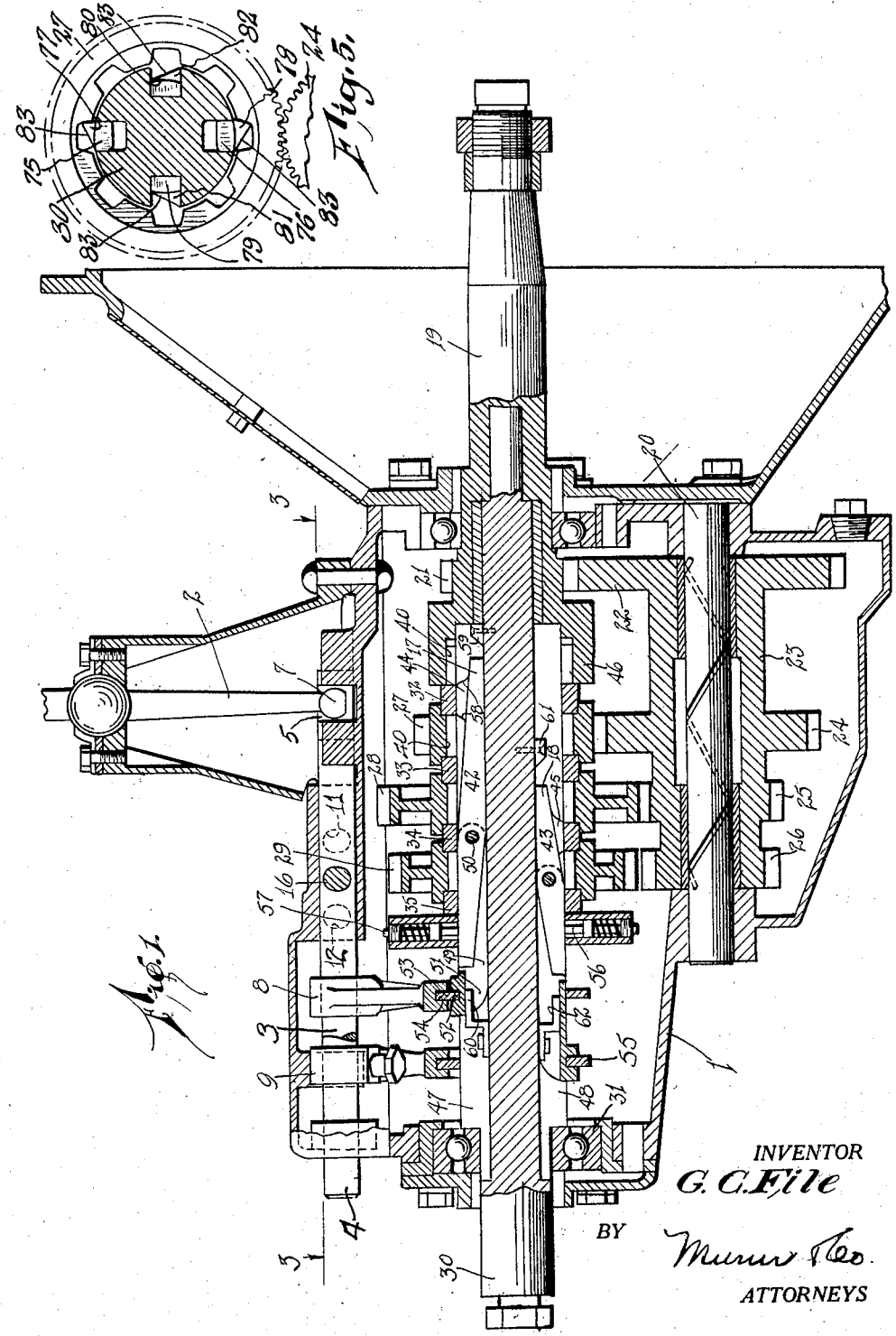

1,532,102

UNITED STATES PATENT OFFICE.

GORDON CLINTON FILE, OF BUCHANAN, MICHIGAN.

TRANSMISSION MECHANISM.

Application filed March 10, 1924. Serial No. 698,252.

*To all whom it may concern:*

Be it known that I, GORDON CLINTON FILE, a citizen of the United States, and a resident of Buchanan, in the county of Berrien and State of Michigan, have invented a new and useful Improvement in Transmission Mechanism, of which the following is a full, clear, and exact description.

My invention relates to improvements in transmission mechanism, and it consists in the combinations, constructions and arrangements herein described and claimed.

An object of my invention is to provide a transmission mechanism in which all of the gears are constantly in mesh and which has keys of novel construction for locking certain of these gears to the shaft on which they are disposed, these keys only engaging with the gears when the gears are disposed in such relation with respect to the keys, as to permit the keys to positively engage therewith.

A further object of my invention is to provide a device of the kind described in which the keys are constructed so as to prevent the gears they engage with from rotating in either direction with respect to the shaft.

A further object of my invention is to provide a device of the type described in which the portion of the keys that engages with the gears is shaped so as to obviate the necessity of machining the key to a fine degree of accuracy.

A further object of my invention is to provide a device of the type described which has means for positively locking the keys against movement, when the keys operatively engage with their respective gears.

A further object of my invention is to provide a device of the type described in which the keys yieldingly engage with the gears, whereby the keys are adapted to swing out of engagement for an instant, in case the keys should not engage with the gears at the proper time, the keys being adapted to swing into engagement with the gears and to be locked in place when the gears are in proper position to receive the keys.

A further object of my invention is to provide a device of the type described in which one key is adapted to be moved into engagement with two gears, whereby a four speed transmission device may be controlled by two keys.

A further object of my invention is to provide a device of the type described which is adapted to make use of two keys for each gear, one key preventing the gear from rotating in one direction with respect to the shaft while the other key prevents the rotation of the gear in the opposite direction.

A further objection of my invention is to provide a device of the type described which is especially adapted for transmission devices in automobiles, although it may be applied to any variable speed mechanism that has one or more different speeds.

Other objects and advantages will appear in the following specification, and the novel features of the invention will be particularly pointed out in the appended claims.

My invention is illustrated in the accompanying drawings forming part of this application, in which Figure 1 is a vertical section through the device.

Figure 2 is a detailed view of a portion of the device.

Figure 3 is a section along the line 3—3 of Figure 1.

Figure 4 is a section along the line 4—4 of Figure 2.

Figure 5 is a sectional view of a modified form of the device.

In carrying out my invention I provide a casing 1 that carries a gear shift lever 2. The gear shift lever 2 is adapted to be actuated in the same manner as the standard gear shift lever in an automobile. As will be noted from Figure 3 the lever 2 is adapted to be swung into operative engagement with the rod 3 or the rod 4. The rods 3 and 4 have forks 5 and 6, these forks being adapted to receive the lower end 7 of the lever 2. The rod 3 is operatively connected by means of an arm 8 to the second and third speed gears, while the rod 4 is operatively connected by means of an arm 9 to the reverse and first speed gears. The rod 3 when moved in the direction of the arrow, shown in Figure 3, shifts the transmission mechanism into second speed. The spring pressed ball 10 in this instant will be received in the notch 11. When the rod 3 is moved in the opposite direction, until the ball 10 enters the recess 12, the transmission mechanism will be in third or high speed. In like manner the rod 4 when moved in the direction of the arrow will shift the mechanism into reverse when a spring pressed ball 13 is received in the notch 14, while the transmission mechanism will be in first speed when the ball 13 is received in the notch 15. A pin 16 prevents either one of the rods 3 or 4 from being accidentally moved when the other rod is being moved.

In Figures 1 and 2 I have shown how the arms 8 and 9 are connected to the gear engaging keys 17 and 18, whereby a movement of the arms 8 or 9 will shift the mechanism into reverse, first, second or third speed at the will of the operator. From Figure 1 it will be noted that the power shaft or driving shaft 19 is connected to an intermediate shaft 20 by means of a gear 21 and a gear 22. The gear 22 has a sleeve 23 upon which are mounted gears 24, 25, and 26. I have shown the gears as being integral, although these gears may be separately mounted upon the shaft 20 if desired, without departing from the spirit and scope of my invention. The gear 24 is in mesh with a second speed gear 27, while the gear 25 is in mesh with a first speed gear 28. The gear 26 is in mesh with the reverse speed gear 29 by means of an intermediate gear not shown.

The gears 27, 28, and 29 are loosely mounted upon a driven shaft 30. This shaft is rotatably mounted in the inner end of the shaft 19 and is also rotatably carried by the casing 1 at 31. The gears 27, 28, and 29 are adapted to rotate independently of each other and are mounted upon collars 32, 33, 34, and 35. From Figure 2 it will be noted that the collars are secured in place upon the shaft 30 by means of keys 36. Each of these keys has a pin 37 that is adapted to enter a collar, whereby the collars are held against longitudinal movement with respect to the shaft 30. The keys 36 are placed end to end, and the last key is held in place by means of a set screw 38. The keys are received in a groove 39 in the shaft 30.

As heretofore stated the gear engaging keys 17 and 18 are adapted to operatively connect the gears on the shaft 30 to the shaft. To effect this operation I have provided the gears 27, 28, and 29 with recesses 40 that have tapered walls 41, see Figure 4. The keys 17 and 18 have arms 42 and 43 that have projections 44 and 45 that are adapted to enter any one of the recesses 40. The sides of the projections 44 and 45 are tapered in the same manner as the walls 41 of the recesses 40. In Figure 1, I have shown the projections 44 and 45 as being disposed beneath the collars 32 and 34 respectively. If now however the key 17 is moved in either direction the projection 44 will enter one of the recesses 40 in the gear 27, or one of the recesses 40 in the third speed mechanism 46. In like manner when the key 18 is moved in either direction it will enter anyone of the recesses 40 in gears 28 or 29.

In Figure 2 I have shown the keys 17 and 18 moved from their position shown in Figure 1. It should be noted that the keys, as shown in Figure 2, will not be in the positions illustrated at the same time, since it would be impossible to connect the third speed gear 46 and the reverse gear 29 to the shaft 30 at the same time. The keys 17 and 18 are merely shown in this position to more clearly illustrate the operation of the device.

The keys are slidably mounted in grooves 47 and 48 in the shaft 30. The key 17 has its arm 42 pivotally secured to a body portion 49 of the key by means of a pin 50. The body portion 49 has a recess 51 that receives part of the arm 42. A groove 52 is provided in the body portion 49 and receives a ring 53 that is slidably mounted upon the shaft 30. The ring 53 in turn is received in a groove 54 of the arm 8. The key 18 is constructed in identical the same manner as the key 17 except for the fact that the arm 43 is shorter than the arm 42. The ring 55 connects the key 18 with the arm 9.

From the foregoing description of the various parts of the device the operation thereof may be readily understood. Assume that the driver wishes to shift from neutral into first speed. He swings the lever 2 so as to engage with the rod 4 and to move the rod in the opposite direction from the arrow shown in Figure 3. This movement moves the ring 55 and the key 18 so as to release the projection 45 from the collar 34 and position the projection beneath one of the recesses 40 in the first speed gear 28. A spring pressed pin 56 swings the arm 42 so as to move the projection 45 into the recess 40, as soon as the projection is freed from the collar 34. It will be noted from Figure 1 that the spring pressed pin 56 always bears against the arm 43, while a spring pressed pin 57 bears against the arm 42. As heretofore stated the sides of the projection 45 are bevelled so as to contact with the sides 41 of the recesses 40. This bevelling permits the projection 45 to readily enter the recess 40 and to wedge in the recesses so as to provide a positive connection between the gear 28 and the shaft 30.

It should be noted at this point that the walls of the recesses 40 and the walls of the projections 45 do not have to be machined to a fine degree of accuracy, since the tapered walls of the projection are adapted to wedge into the tapered walls of the recess even though the contacting parts are not accurately finished. Furthermore in case of wear between the projection and the wall of the recess, the arm will be swung further so as to move the projection a greater distance into the recess and thus automatically take up the wear. As soon as the projection 45 is received in one of the recesses 40, the gear 28 is positively connected to the shaft 30. There is now a direct connection between the shaft 19 and the shaft 30 through the medium of the gears 21, 22, 25 and 28. The mechanism is now in first speed.

If the projection 45 should happen to come into engagement with the gear 28 when the recess 40 was not in alinement with the projection, the projection would merely remain in the position shown in Figure 1, until the recess comes into alinement with the projection. The projection 45 will enter one of the recesses 40 as soon as the recess is alined with the projection. In this way I have provided a novel means for permitting the key 18 to lock the gear 28 to the shaft 30, only when one of the recesses 40 is in alinement with the projection 45.

In shifting from first speed to second speed the rod 4 is first moved so as to move the key 18 back into the position shown in Figure 1. The lever 2 now actuates the arm 8 and the key 17 so as to swing the projection 44 into one of the recesses 40 in the second speed gear 27. It will be noted from Figure 1 that the sides 58 of the projection 44 are tapered so as to permit the projection to slide beneath the collar 32 when the projection is moved past the collar. In shifting from second speed to third speed the projection 44 is moved from the gear 27 to one of the recesses 40 in the third speed mechanism 46. The shaft 19 is now directly connected to the shaft 30.

The keys 17 and 18 are locked against movement when they are moved into engagement with their respective gears. It will be seen from Figure 1 that the grooves 47 have a lug 59 and a hook 60 disposed therein. When the projection 44 is in one of the recesses 40 in the third speed mechanism 46, the arm 42 will bear against the lug 59, see Figure 2, and will be prevented from swinging back into the groove. When the projection 44 connects the gear 27 with the shaft 30 the inner end of the arm 42 will be received by the hook 60. The hook 60 prevents the projection 44 from moving out of egagement with the gear 47. The groove 48 has a lug 61 and a hook 62 that performs the same function as the lug 59 and the hook 60. The lugs 59 and 61 and the hooks 60 and 62 positively lock the arms 42 and 43 against movement, when these arms are in operative engagement with any one of the gears.

One principal advantage of the device lies in the fact that the arms 42 and 43 are swung up into engagement with their respective gears, instead of being rocked into engagement as heretofore stated. This construction permits the arms to swing out of engagement with their gears in case one of the recesses in the gears should be out of alinement with the arm and also permits the projection on the arm to swing further into the recess, in case the projection has become slightly worn. It will also be noted that two keys are sufficient for four speeds. If it is desired to lock the gears to the shaft by more than one key it is merely necessary to add more grooves to the shaft and to dispose additional keys in these grooves. No part of the key has to be accurately finished since the projection will lock itself in the gear recess due to the fact that it is wedge-shaped. The key can therefore be more cheaply made than can keys which have to be accurately finished. The wedge-shaped projection also permits the key to properly function even though slightly worn.

The keys are not rocked into engagement with the gears and therefore the grooves receiving the keys do not have to be rounded. This is another saving in the cost of manufacture. The keys consist of a body portion and an arm or lever pivotally secured to the body portion. The body portion may be swung with respect to the arm when it is desired to remove the key from the groove, thus obviating the necessity of dismantling the mechanism whenver it is desired to change keys. The only part of the key subjected to wear is the projection. An addition of a new arm to the body portion therefore will be all that is necessary to make the key function as a new one.

In Figure 5 I have shown a modified form of the device, this form being identical to the preferred form except that two locking keys are provided for each gear in place of one. The keys 75 and 76 are for second and third speeds and are shown in operative position. The gear engaging lug 77 is adapted to prevent the gear from rotating in one direction with respect to the shaft 30 while the lug 78 on the key 76 prevents the gear from rotating in the opposite direction. Keys 79 and 80 are for first and reverse speeds and prevent the rotation of these gears in either direction in the same manner as keys 75 and 76. Each of the lugs 77, 78, and 81, and 82 has a beveled side 83 that does not operatively engage with its respective gear.

I claim:

1. In a transmission mechanism, a shaft having grooves therein, gears loosely mounted on said shaft, keys slidably disposed in said grooves and comprising a body portion, and arms pivotally secured to said body portion, each key being adapted to move its arm into operative engagement with either one of two gears, means for swinging said arms, and means disposed in said grooves and adapted to engage with said arms when said arms are in engagement with either one of their respective gears, whereby said arms are locked against accidental disengagement from said gears.

2. In a transmission mechanism, a shaft having grooves therein, gears loosely mounted on said shaft, keys slidably disposed in said grooves and comprising a body portion, and arms pivotally secured to said body portion, each key being adapted to move its arm into operative engagement with either one of two gears, means for swinging said arms, means disposed in said grooves and adapted to engage with said arms when said arms are in engagement with either one of their respective gears, whereby said arms are locked against accidental disengagement from said gears, said means for swinging said arms comprising a disc carried by said shaft, spring pressed pins carried by said disc and engaging with said arms, said pins being adapted to yieldingly hold said arms in operative engagement with said gears.

3. In a transmission mechanism a shaft having grooves therein, gears loosely mounted on said shaft, keys slidably disposed in said grooves and comprising a body portion, and arms pivotally secured to said body portion, each key being adapted to move its arm into operative engagement with either one of two gears, means for swinging said arms, means disposed in said grooves and adapted to engage with said arms when said arms are in engagement with either one of their respective gears, whereby said arms are locked against accidental disengagement from said gears, and means disposed in said grooves comprising projections having cam-shaped sides and being secured to said shaft.

4. In a transmission mechanism, a shaft having grooves therein, gears loosely mounted on said shaft, keys slidably disposed in said grooves and comprising a body portion, and arms pivotally secured to said body portion each key being adapted to move its arm into operative engagement with either one of two gears, means for swinging said arms, means disposed in said grooves and adapted to engage with said arms when said arms are in engagement with either one of their respective gears, whereby said arms are locked against accidental disengagement from said gears, said means for swinging said arms comprising a disc carried by said shaft, spring pressed pins carried by said disc and engaging with said arms, said pins being adapted to yieldingly hold said arms in operative engagement with said gears, and means disposed in said grooves comprising projections having cam-shaped sides and being secured to said shaft.

GORDON CLINTON FILE.